United States Patent [19]
Alessio

[11] 4,154,435
[45] May 15, 1979

[54] PORTABLE WORKBENCH

[75] Inventor: Lorenzo E. Alessio, Lecco, Italy

[73] Assignee: The Black and Decker Manufacturing Company, Towson, Md.

[21] Appl. No.: 880,250

[22] Filed: Feb. 22, 1978

[51] Int. Cl.² .............................................. B25B 1/22
[52] U.S. Cl. ................................ 269/139; 144/286 R; 269/154; 269/244; 269/321 CF
[58] Field of Search .................... 269/79, 104–106, 269/134–135, 139, 239, 154–156, 151–152, 244, 321 CF; 144/286 R; 51/216 A, 217 A; 125/35

[56] References Cited

U.S. PATENT DOCUMENTS

| | | | |
|---|---|---|---|
| 1,194,666 | 8/1916 | Romanowski | 269/139 |
| 1,859,920 | 5/1932 | Haskins | 269/239 X |
| 2,502,784 | 4/1950 | Fahlander | 269/139 |
| 4,054,279 | 10/1977 | Wain | 269/154 |
| 4,073,484 | 2/1978 | Beekenkamp | 269/321 CF |

FOREIGN PATENT DOCUMENTS

1,287,657  2/1962  France ............................. 269/139

*Primary Examiner*—Robert C. Watson
*Attorney, Agent, or Firm*—Walter Ottesen; Leonard Bloom; Edward D. Murphy

[57] ABSTRACT

A portable workbench has a supporting structure defining a supporting surface. The supporting structure includes a collapsible leg assembly for supporting the supporting surface above a floor surface. A first top member having an upper surface is supported by the supporting structure on the supporting surface. A second top member likewise has an upper surface and the upper surfaces lie in a substantially horizontal plane. The top members also have respective mutually adjacent side walls defining clamping surfaces. A guiding structure is provided for guiding the second top member relative to the supporting structure. The second top member can be moved along the guiding structure so as to adjust the position of the second top member with respect to the first top member. The guiding structure is pivotally mounted so that the second top member can be rotated from a first position on the supporting surface whereat the upper surfaces of the top members are in the same horizontal plane to a second position whereat the second top member is in a plane transverse to the above-mentioned horizontal plane so as to cause the clamping surfaces and the supporting surface to conjointly define a three point clamping system. In the first position, the portable workbench is suited for clamping workpieces having two surfaces that are substantially parallel to each other; whereas, in the second position, the portable workbench is especially suited to clamping workpieces having a cylindrical or polygonal shape such as, for example, a section of tubular conduit.

19 Claims, 20 Drawing Figures

PORTABLE WORKBENCH

BACKGROUND OF THE INVENTION

The invention relates to a portable workbench including at least two top members supported on a supporting structure. The supporting structure includes a collapsible leg assembly for supporting the top members above a floor surface. One of the top members can be rotated through an angle and moved against the workpiece in a plane defining an angle with respect to the supporting structure to thereby cause the top members and the supporting structure to conjointly define a three point clamping system. Depending on the angular position of the one top member, the portable workbench is suitable for clamping workpieces having various shapes including those of cylindrical or polygonal configuration.

Up to the present time, the general configuration of the workpiece has dictated to the operator which workbench is to be used for clamping the workpiece. For example, workbenches are known wherein a fixed jaw and a movable jaw are both members having a flat and elongated configuration carried on a supporting structure having legs. The movable jaw can be moved away from and toward the fixed jaw by means of threaded spindles actuated manually by means of a crank. The angular adjustment of these jaws is always made in the same horizontal plane conjointly defined by the upper surfaces of the two jaws. The workpiece can then be clamped only between the mutually adjacent vertical clamping surfaces defined by the two jaws.

This is a limitation and frequently prevents an operator from working on the workpiece in its most favorable position and in some cases prevents the operator from working with the vise altogether. Often an operator must do work on a workpiece of cylindrical or some other shape as opposed to workpieces which are of square or rectangular section. For clamping such a workpiece effectively, it is necessary that the workpiece be held at least at three points about its periphery. With regard to tubular conduit for example, the operator would normally reach for a special clamping arrangement having V-shaped grooves in each of its clamping jaws so that the workpiece would be held at four locations about its periphery. Thus, it becomes apparent that the operator would have to have at least two clamping arrangements in order to perform work in most situations. Even at that, however, the operator could not necessarily work on a workpiece in the most desirable position. Often, it is desirable to be able to clamp a workpiece down on a horizontal work surface of a workbench so that operations such as planing or routing can be performed.

Another type of clamping arrangement has been suggested in French Pat. No. 1,287,657 to Travers, wherein a workpiece can be clamped to either of two clamping surfaces of a first clamping jaw of a clamping arrangement having two clamping jaws. The first clamping jaw can be clamped to the top of a table so as to be held in a substantially horizontal plane so that one of its clamping surfaces is in a vertical plane and its other clamping surface is in the horizontal plane. The second clamping jaw has one clamping surface and is pivotally mounted to the first clamping jaw with the aid of two threaded rods and is rotatable between two positions ninety degrees apart. The threaded rods are pivotally mounted in recesses of the first jaw. The French patent teaches that the clamping jaws can be used to clamp a workpiece in either of two positions, namely, when the second jaw is in a first position wherein the clamping surface of the second jaw is in the vertical position and in a second position wherein the clamping surface of the second jaw is horizontal and parallel to the horizontal clamping surface of the first jaw.

Although with this clamping arrangement the operator has the capability of clamping a workpiece to a horizontal work surface, the operator cannot clamp a workpiece of, say, tubular configuration because for each of the two positions, there are only two clamping surfaces. As mentioned, above, to hold a workpiece of tubular configuration effectively requires at least three clamping surfaces. Therefore, even if the operator has a clamping arrangement of the type taught by Travers, the operator would still need an additional vise such as a pipe vise.

Another disadvantage of the clamping arrangement of the type disclosed in the French patent is that long workpieces of rectangular section cannot be effectively held down upon the clamping surfaces of the first clamping jaw since such a workpiece can only be inserted between the clamping surfaces of the two jaws to the depth of the threaded rods which pass through the longitudinal center of the second jaw. When clamping the workpiece, a turning moment is developed which causes the second jaw to slip off of the workpiece.

SUMMARY OF THE INVENTION

It would indeed be desirable to have a workbench which permits clamping a workpiece between clamping members in a horizontal position and also affords the capability of positioning one of the clamping members at an angle with respect to the other clamping member so that the same workbench can accommodate all workpieces irrespective of the workpiece configuration.

Also, it would be helpful if the same workbench can firmly hold a long workpiece down upon the top surface of the other one of the clamping members without the one clamping member slipping off of the workpiece when the clamping arrangement of the workbench is tightened.

Accordingly, it is an object of my invention to obviate the above disadvantage of the prior art workbenches and clamping arrangements and provide a portable workbench which can accommodate workpieces of different shapes and configurations. More specifically, it is an object of my invention to provide a portable workbench wherein a three point clamping system is provided when desired so that workpieces having a cylindrical or polygonal configuration can also be clamped.

In addition to all the foregoing, it is desirable to provide a portable workbench which can perform all the above functions and yet also be capable of shaping workpieces having a planar configuration.

Therefore, it is still a further object of my invention to provide a portable workbench wherein workpieces having a planar configuration such as sheetmetal can be shaped.

The portable workbench according to my invention includes a supporting structure defining surface support means. The supporting structure includes a collapsible leg assembly for supporting the surface support means above a floor surface. A first top member having an upper surface is supported by the supporting structure on the surface support means thereof. A second member likewise having an upper surface is provided and the upper surfaces of the two top members lie in a common substantially horizontal plane. The top members have respective mutually adjacent side walls which define clamping surfaces. Guiding means are provided for guiding the second top member relative to the supporting structure and mean for moving the second top member along the guiding means adjusts the position of the second top member with respect to the first top member. Rotation means are provided for conjointly rotating the guiding means and the second top member from a first position on the surface support means to a second position whereat the second top member is in a plane transverse to the above-mentioned horizontal plane so as to cause the clamping surfaces and the surface support means to conjointly define a three point clamping system.

According to a preferred embodiment, the workbench can include moving means including first and second clamping means interconnected between the guiding means and the second top member for moving the second top member over the guide means in a direction toward or away from the first top member for tightly holding a workpiece between the top members when the second top member is in the first position and between the top members and the surface support means when the second top member is at the second position. The first clamping means and the second clamping means are connected to the guide means and the second top member so as to be capable of being operated independently of each other whereby the width of the clamping gap between the top members can be adjusted to be greater at one longitudinal end of the gap than at the other longitudinal end of the gap.

BRIEF DESCRIPTION OF THE DRAWING

The foregoing objects and advantages of my invention will become more apparent from a consideration of the detailed description to follow in conjunction with the drawings annexed hereto wherein.

DESCRIPTION OF THE PREFERRED EMBODIMENTS OF THE INVENTION

Figure 1A:
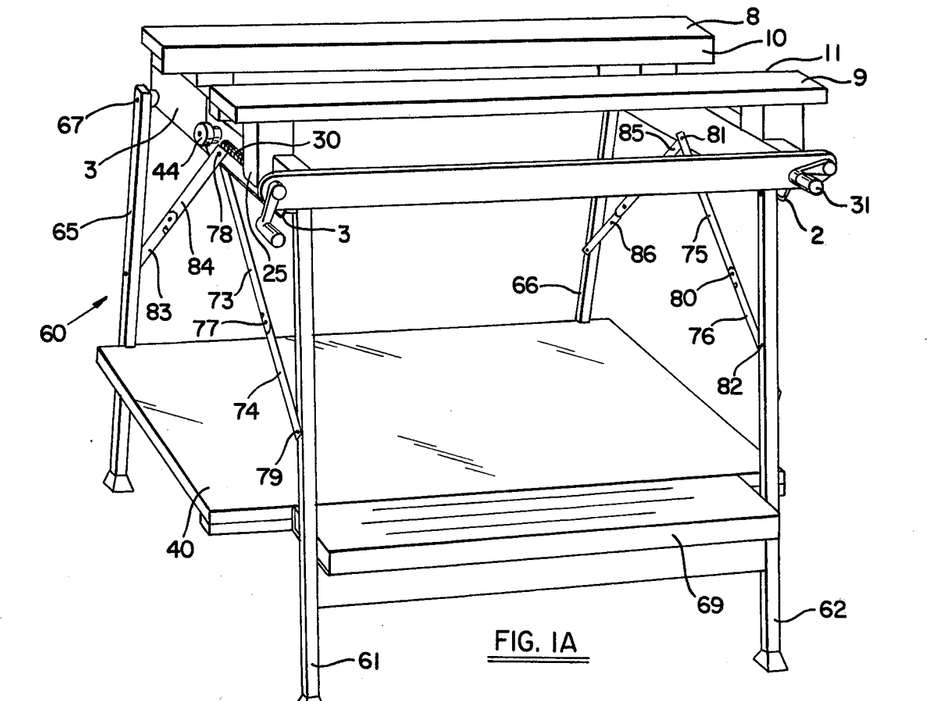
FIG. 1A is a perspective view of the portable workbench according to my invention showing the two clamping members mutually adjacent so that their respective upper surfaces lie in a common substantially horizontal plane.
Figure 1B:
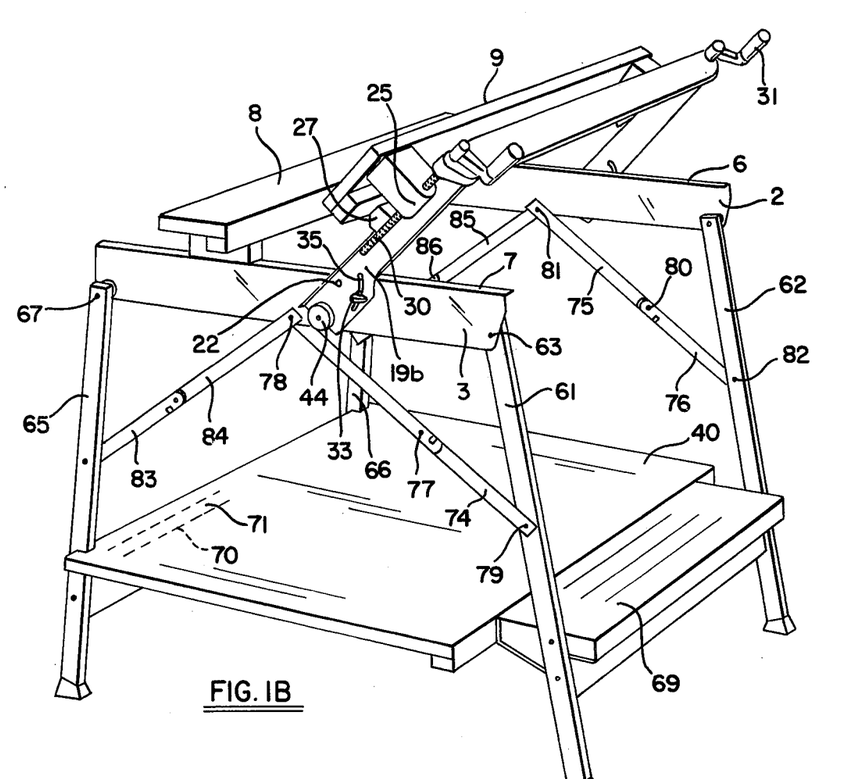
FIG. 1B is a perspective view of the portable workbench showing the rotatable top member in a selected angular position.

Referring to FIGS. 1A and 1B, the portable workbench according to my invention includes a collapsible leg assembly designated by reference numeral 60 for supporting the beams 2 and 3 and the first and second top members 8 and 9. The top members 8 and 9 are clamping jaws having clamping surfaces 10 and 11, respectively.

The collapsible leg structure 60 is shown in the open position in FIGS. 1A and 1B and includes two pairs of articulated legs. A first pair of articulated legs 61 and 62 are pivotally connected to beams 2 and 3 at the front ends thereof at respective pivot connections 63 and 64. A second pair of articulated legs 65 and 66 are pivotally connected to beams 2 and 3 at the back ends thereof, at respective pivot locations 67 and 68.

The legs 61 and 62 are interconnected by a cross member which is in the form of a step 69; whereas, the legs 65 and 66 are connected by a crosspiece 70 of which the upper edge 71 is co-planar with a shelf-like recess 72 of the step 69. Between the upper edge 71 and recess 72 a third bench top member 40 is supported and is provided for the purposes which will be explained below. The upper edge 71 and recess 72 conjointly define carrying means for removably carrying the third top member 40 beneath the top members 8 and 9 when the collapsible leg assembly is in the open position.

The leg pairs 61, 62 will not open beyond the open position shown in FIGS. 1A and 1B because of the bracing provided by bracing rod pairs 73, 74 and 75, 76. Bracing rods 73 and 74 are pivotally connected to each other at pivot connection 77 and rod 73 is pivotally connected to beam 3 at an intermediate pivot location 78 thereon. Bracing rod 74 is pivotally connected at 79 to leg 61. Rods 75 and 76 are likewise pivotally connected to each other at 80 and to beam 2 and leg 62 at pivot connections 81 and 82, respectively. A corresponding bracing arrangement is provided for the rear leg pair 65, 66 by the pair of bracing rods 83, 84 for leg 65 and a pair of bracing rods 85, 86 for leg 66.

Figure 2:
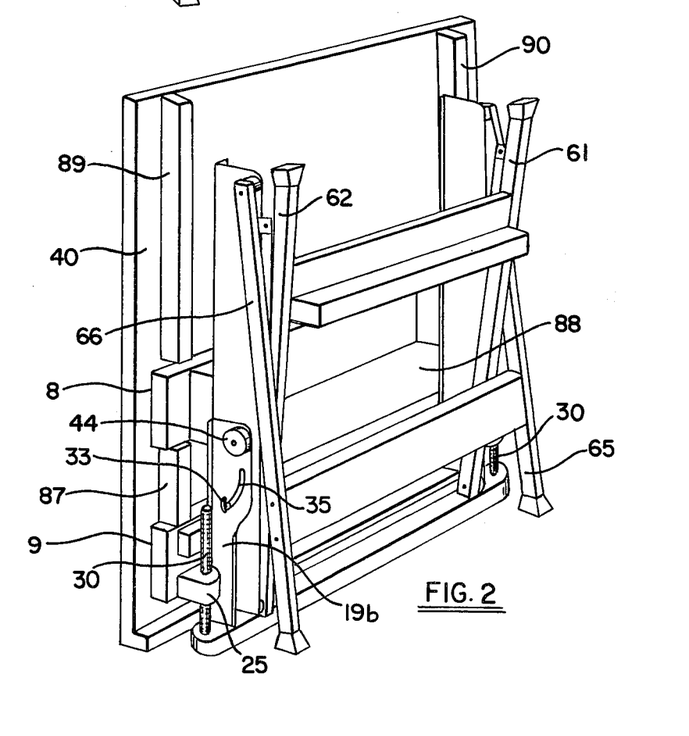
FIG. 2 is a perspective view of the portable workbench with the leg assembly in the collapsed position.

When the workbench is collapsed to the position shown in FIG. 2, the third bench top member 40 is first removed from its location on upper edge 71 and recess 72 and clamped between the clamping jaws 8 and 9. The clamping jaws 8 and 9 are tightened to clamp on spacer support means comprising the narrow spacer supports 87 and 88. With the aid of the articulated leg pairs described above, the first and second leg pairs are folded against the beams 2 and 3. The workbench is easily stored in a limited space or transported when in the collapsed position.

Referring now to FIGS. 1A and 1B, the collapsible leg assembly is part a supporting structure which includes two spaced apart elongated frame members in the form of U-shaped beams 2 and 3. The beams 2 and 3 are L-shaped, however, they can be of any other suitable section if desired.

The beams 2 and 3 are arranged so that respective legs 6 and 7 thereof conjointly define surface support means on which the first and second top members 8 and 9 are supported. The first top member 8 has an upper surface 12 and is supported on the L-shaped beams 2 and 3 with the aid of spacer supports 13 and 14 as shown. The second top member 9 also has an upper surface 15. The second top member 9 is shown equipped with spacer supports 16 and 17 respectively, which support the second top member 9 on the respective horizontal flanges 6 and 7 of the beams 2 and 3 when the top member 9 is in the horizontal position shown in FIG. 3.

Guiding means in the form of a U-shaped bracket 18 guides the second top member 9 on the supporting structure 1. The legs 19 and 20 of the bracket 18 are interconnected by a front connecting piece 21 and are pivotally connected to the vertical leg of L-shaped beams 2 and 3 as will be shown below. When the guiding means is in the position shown in FIG. 3 a flange 21a of connecting piece 21 rests on the ends of the flanges 6 and 7 of the beams 3 and 2, respectively.

Although the spacer supports 13, 14, 16 and 17 are not necessary to the operation of the clamping jaws of the portable workbench, they are desirable because they increase the depth to which a workpiece can be inserted between the top members 8 and 9.

The second top member 9 is movable on the guide means and is mounted on the leg 19 and 20 which guide and hold the second top member. The legs 19 and 20 are essentially L-shaped and are pivotally connected by respective pivot pins 22 to corresponding ones of the beams 2 and 3 preferably at the longitudinal mid portions thereof. The second top member 9 is connected to the legs 19 and 20 so as to be movable therealong in the general manner shown, for example, in my copending United States patent application having Ser. No. 765,296 and filed on Feb. 3, 1977, under the title: Foldable Workbench. Thus, means are provided for moving the second top member 9 along the guiding means to adjust the position of the second top member 9 with respect to the first top member 8.

Figure 6:
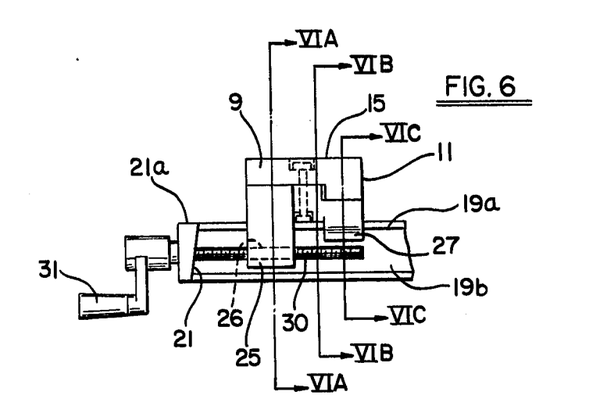
FIG. 6 illustrates details of the mounting of the spacer support on the bracket pivotally mounted on the supporting structure.

The moving means includes first and second clamping means interconnected between the legs 19 and 20 and the top member 9 for moving the second top member 9 over the legs 19 and 20 in a direction toward or away from the first top member. One of the clamping means is shown in the exploded view of FIG. 6.

The clamping means includes the support 16 which is pivotally connected to the second top member 9 by means of a bolt 23. Detail views of the support 16 is shown in FIGS. 6A to 6C.

Figure 3:
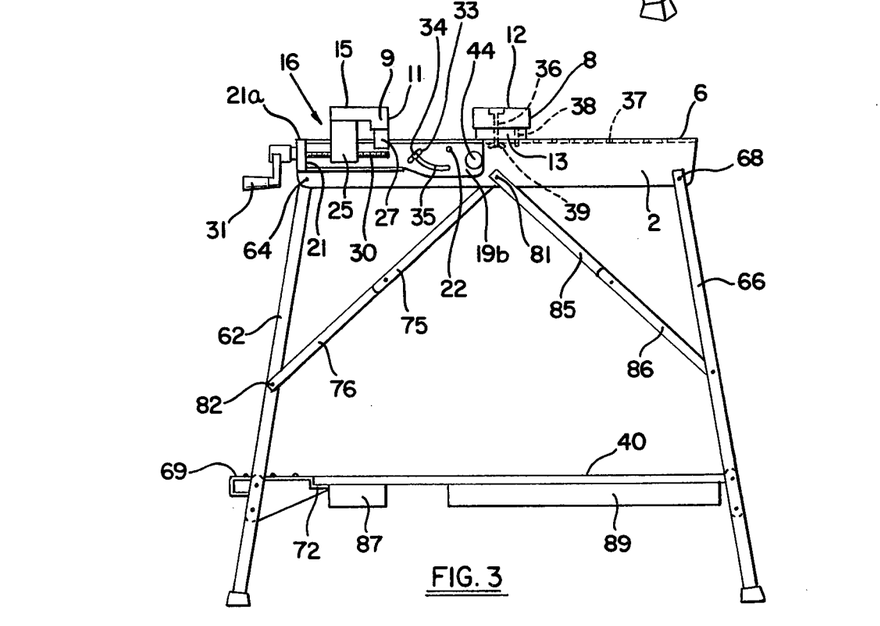
FIG. 3 is a side elevation view of the portable workbench and shows the two clamping members mutually adjacent so that their respective upper surfaces lie in a common substantially horizontal plane.
Figure 6A:
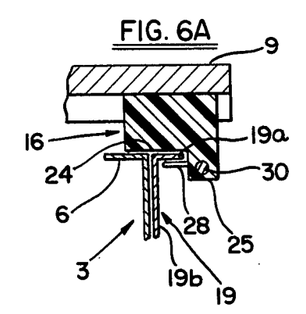
FIG. 6A is a section view taken along line VIA—VIA of FIG. 6.
Figure 6B:
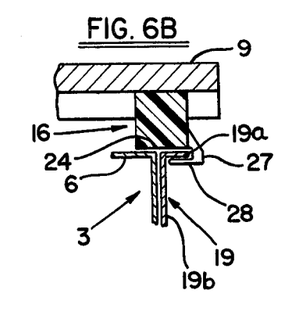
FIG. 6B is a section view taken along line VIB and VIB of FIG. 6.
Figure 6C:
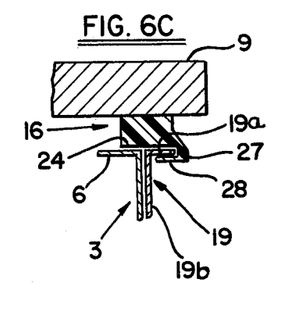
FIG. 6C is a section view taken along line VIC—VIC of FIG. 6.

As shown in FIG. 6A, the support 16 has a flat-bottom surface 24 which rests on the horizontal flange 6 of beam 2 when the top member 9 is in the horizontal position shown in FIG. 3. A portion of the bottom surface 24 also rests on the holding leg 19. The support 16 also includes a first downwardly extending portion 25 which contains an internal thread 26. The internal thread 26 can be, for example, a nut trapped in the portion 25. FIG. 6B shows a section view of the support 16 at the line VIB—VIB of FIG. 6.

A second downwardly extending portion 27 of the support 16 (FIG. 6C) defines an open slot 28 for slideably engaging the horizontal flange 19a of holding leg 19.

The second top member 9 is translated along the holding legs 19 and 20 with the aid of threaded spindles 30 and the internal thread 26 threadably engaging the spindle. The spindle 30 is rotatably engaged in the front connecting piece 21 so that it cannot move axially with respect thereto. The spindle 30 is rotated with the aid of the crank handle 31. This action causes the support 16 to move along the flange 19a of the leg 19 thereby causing the second top member 9 to move toward or away from the first top member 8 depending upon the direction of rotation of the crank 31. The second downwardly extending portion 27 helps hold and guide the support 16 with respect to the leg 19. If only one of the cranks 31 is rotated then the top member 9 will be at an angle with respect to top member 8. By rotating both cranks 31 simultaneously, the top member 9 can be moved toward top member 8 so that the gap width therebetween is the same at both longitudinal ends of the gap.

Figure 4:
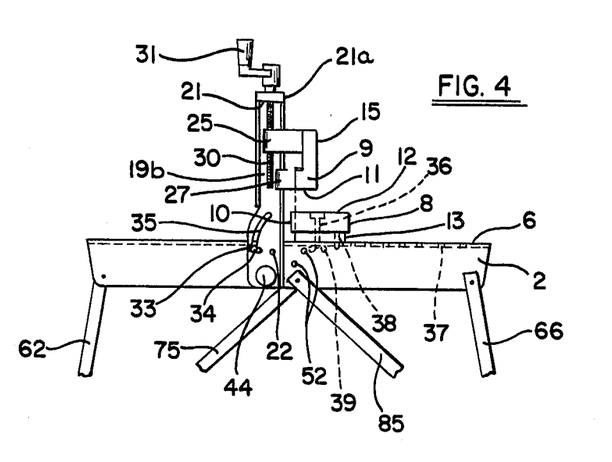
FIG. 4 shows how one top member can be rotated through an angle to a position 90° for clamping a workpiece against the upper surface of the other top member.

Means are provided for conjointly rotating the guiding means 18 and the second top member 9 from a position (FIG. 3) on the respective flanges 6 and 7 of beams 2 and 3 whereat the upper surfaces 12 and 15 are in a common horizontal plane to the position shown in FIG. 4 whereat the clamping surface 11 of the second top member 9 is adjacent this horizontal plane. The rotating means for achieving rotation of the guiding means and the second top member 9 includes the pivot pin 22 referred to above.

Figure 5:
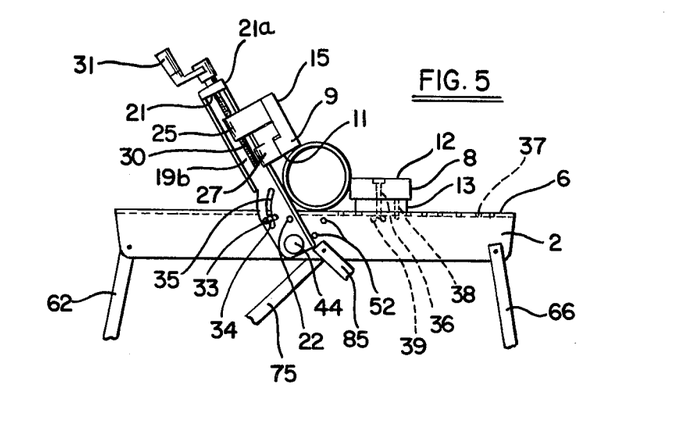
FIG. 5 shows how the rotatable top member can be adjusted to any selected angular position between the two positions shown in FIGS. 3 and 4 respectively, to clamp a workpiece such as a pipe section.

The guiding means and second top member 9 are adjustable to any selected angular position between the positions shown in FIGS. 3 and 4 such as the angular position shown in FIG. 5. In this angular position, the upper surface of the second top member 9 is in a plane transverse to the above-mentioned horizontal plane thereby causing the clamping surfaces 10 and 11 and the surface support means in the form of legs 6 and 7 to conjointly define a three point clamping system as shown in FIG. 5. For the positions shown in FIGS. 4 and 5, the second top member can be actuated and moved along the horizontal flanges of legs 19 and 20 as described above.

In the first position, the second top member 9 is supported on the beams 2 and 3 through the spacer supports 16 and 17 which rest on the respective horizontal flanges 6 and 7 of beams 2 and 3. In this condition the top horizontal flange 21a of the front connecting piece 21 is dropped onto horizontal legs 6 and 7 of beams 2 and 3, at the front ends thereof.

The holding legs 19 and 20 rotate about pins 22 to any desired position as explained above. However, it is desirable to provide locking means for locking the guiding means with respect to the supporting structure at a selected angular position. Referring to FIG. 5, the locking means can include a clamp in the form of a wing nut 33 threadably engaging a bolt 34 mounted on the beam 2. An arcuate slot 35 is formed in the holding leg 19 and the shank of bolt 34 passes through the slot. The arcuate slots 35 have a radius center at the location of pivot 32. When the wing nut 33 is tightened, the leg 19 is tightly held in position against the beam 2 fixing the guiding means in the desired angular position.

It will be recalled that the portable workbench of my invention can be utilized to clamp a workpiece down on the upper surface of the first top member 8. FIG. 4 shows the second top member 9 in the position to perform this clamping function with the clamping surface 11 in a horizontal plane above the upper surface 12 of the first top member 8. In this manner, a workpiece can be clamped in a suitable position between the clamping surface 11 and the upper surface 12.

When the movable top member 9 is moved toward the upper surface 12 of the first top member 8, the workpiece placed therebetween exerts a reaction force upon the second bench top member 9 at the clamping surface 11. This force acting in the upward direction develops a moment about the pivot pin 22 which tends to slide the second top member 9 off of the workpiece. The locking means performs the additional function of counteracting the effect of this turning moment by developing a counter balancing moment about the pivot pin 22.

It is often desirable to be able to position the first top member 8 along the surface support means. Positioning means can be provided for positioning the first top member 8 along the supporting structure to a selected position on the surface support means whereby the first top member 8 can be manually shifted and located laterally with respect to the second top member 9 to rapidly adjust the coarse width of the clamping gap between these top members to accommodate varying sizes of workpieces whereby the moving means can be manually adjusted to fine adjust the width of the gap to tightly hold the workpiece between the top members when the second top member 9 is in the first position shown in FIG. 3 and between the top members and the surface support means when the second top member 9 is in the positions shown in FIG. 5.

Figure 7:
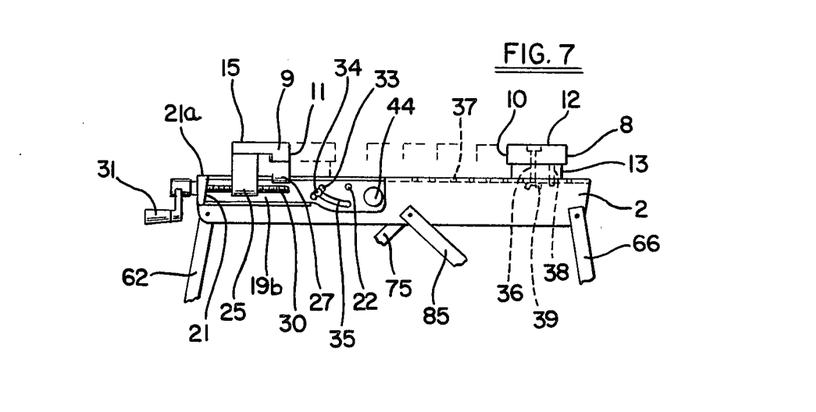
FIG. 7 is a side elevation view of the portable workbench of FIGS. 1 to 6 showing how one of the top members can be positioned to various locations on the supporting structure will respect to the other one of the top members.

More specifically and referring now to FIG. 7, the first top member 8 can be indexed into a number of predetermined selected positions along the beam 2 and 3 an can be held in place by means of bolts 36 which are inserted into indexing means in the form of openings 37 in the horizontal flanges 6 and 7 of the beams 2 and 3. Locating pegs 38 cooperate with the bolts 36 and engage openings in the flanges 6 and 7 adjacent the openings into which the fastening bolts 36 are placed. The wing nut 39 is tightened to secure the first top member 8 in place.

If desired, other means can be utilized for positioning the first top member 8 along the beams 2 and 3. For example, a lever can be provided beneath the first top member 8 to engage and disengage the horizontal flange of the beams 2 and 3 and thereby eliminate the need for a bolt. Still other lever arrangements can be utilized wherein a lever is pressed to disengage pins from the indexing holes and reengage holes 37 in the beams 2 and 3 at a new location thereon.

It is also possible to provide for angular adjustment of the first top member 8 with respect to the second top member 9 so that the angularity achieved by adjusting the second top member 9 with the aid of the moving means can be augmented. To achieve this effect, the top member 8 can be pivotally connected to the support spacers 13 and 14.

The third top member 40 can be advantageously used to deposit tools and other hardware while the workbench is utilized as shown in FIGS. 1A to 7.

Figure 8:
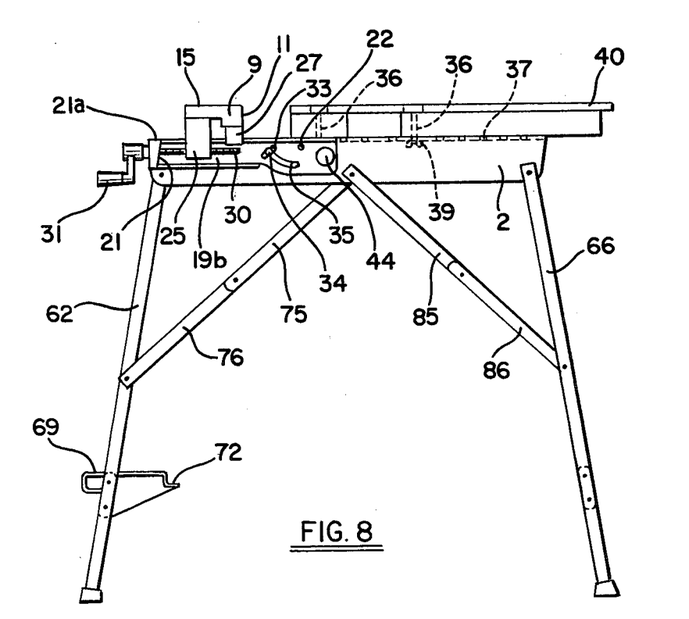
FIG. 8 is an elevation view of the portable workbench wherein the right hand top member has been substituted by a third top member having a very large surface area.
Figure 9:
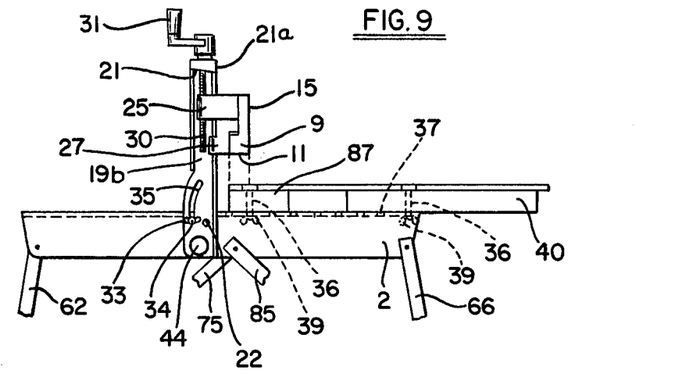
FIG. 9 illustrates the third top member repositioned to a different location on the supporting structure.

FIGS. 8 and 9 show how the first top member 8 can be replaced by the top member 40 affording a greater work surface area to the operator.

Figure 10:
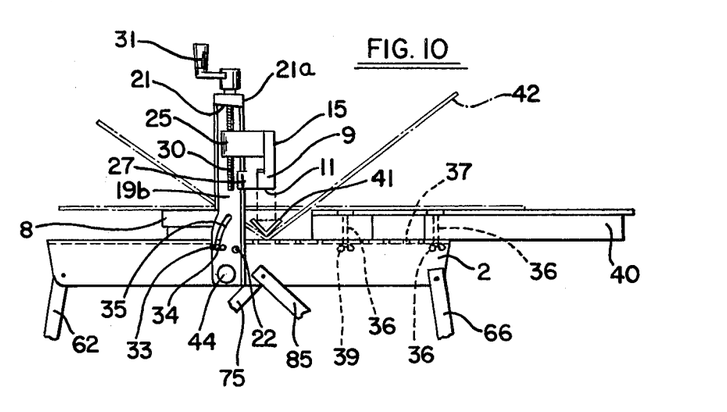
FIG. 10 illustrates how the portable workbench according to my invention can be used for shaping workpieces such as sheet metal.

FIG. 10 shows how the portable workbench of my invention can be utilized for shaping materials such as sheetmetal. In the embodiment shown, the clamping surface 11 is fitted with an angle section 41 for engaging the workpiece 42. The large area top member 40 constitutes a third top member and is supported on the surface support means defined by the supporting structure.

The top member 40 is equipped with two pairs of spacer supports. The spacer supports 87 and 88 of the first pair are narrow and facilitate clamping the member 40 when the workbench is collapsed as described in connection with FIG. 2. Spacer supports 89 and 90 are longer and constitute the second pair. With these pairs of spacer supports, the member 40 rests upon the surface support means when in use as shown in FIGS. 8 to 11.

Suitable means are provided for positioning the third top member 40 along the surface support means. Such means can be the index means as discussed above in connection with FIG. 7. The first and third top members 8 and 40 are indexed so as to be spaced away from the plane defined by the upper surface 15 of the second top member 9 when the second top member 9 is in the vertical position as shown in FIG. 10. A workpiece 42 placed across the first and third top members is shaped when the moving means are actuated to move the second top member 9 along said guide means 18 downwardly on the workpiece.

Figure 11:
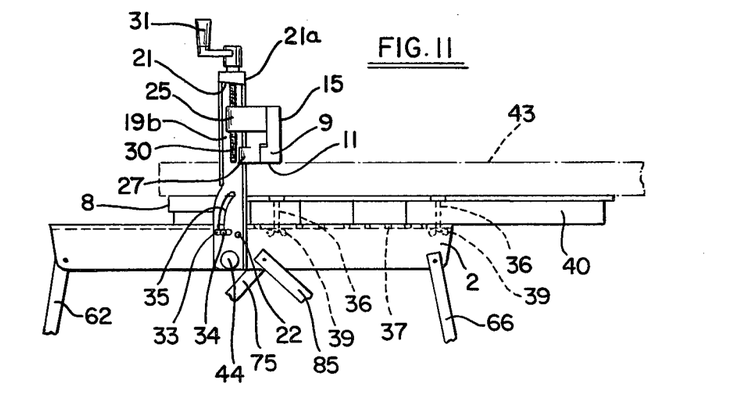
FIG. 11 is a view showing how the first top member and the third top member can be utilized to provide a greater bearing area for clamping a workpiece thereto with the aid of the rotatable top member.

FIG. 11 shows how the first top member 8 and third top member 40 can be placed close to each other to afford increased bearing support to a workpiece 43.

Figure 12:
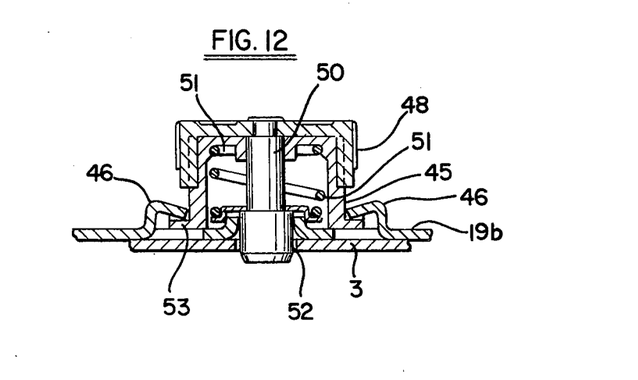
FIG. 12 is a schematic diagram of the locking knob assembly for fixing the angular position of the guiding means at predetermined positions most often used when working with the portable workbench.

The locking means for locking the guiding means with respect to the supporting structure described above with reference to FIGS. 3 to 5 can be augmented to provide for an arrangement for fixing the angular position of the legs 19 and 20 at predetermined positions most often used, for example, 0°, 45° and 90° elevation. Accordingly, locking assembly means for fixing the angular position of the guiding means can be in the form of a locking knob assembly 44 as shown in FIG. 12.

Figure 13:
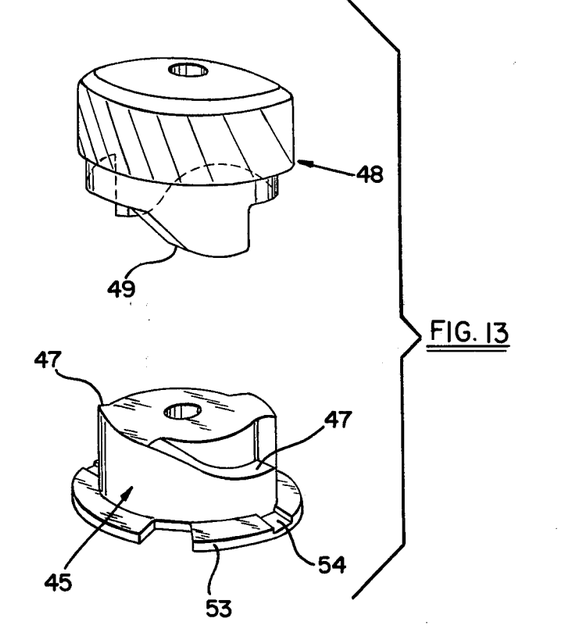
FIG. 13 shows details of two parts of the knob assembly of FIG. 12.

The locking knob assembly 44 includes a hat-shaped piece 45 having a rim 53 which is secured under tabs 46 formed from vertical flange 19b. The tabs 46 engage recesses 54 of the rim 53 to hold the hat-shaped piece 45 tightly to the flange 19b of leg 19. Cam surfaces 47 are formed on the piece 45 as shown in FIG. 13. A second cap-like piece 48 has corresponding cam surfaces 49 and is also shown in FIG. 13. Referring again to FIG. 12, a pin 50 is secured to the piece 48 and a spring 51 acts upon the pin to urge it into engagement with one of the openings 52 when the leg 19 is rotated therepast. Two of the openings 52 in beam 2 are visible in FIG. 4 and correspond to the respective positions 0° and 45°. For the position of the leg 19 shown in FIG. 4, the pin 50 is engaged with the opening 52 corresponding to the 90° position.

If it should be desired to disable the knob-assembly 44, then the piece 48 is rotated so that cams 49 ride upon cams 47 so as to lift the pin 50 clear of the beam 3 thereby compressing spring 51.

Figure 14:
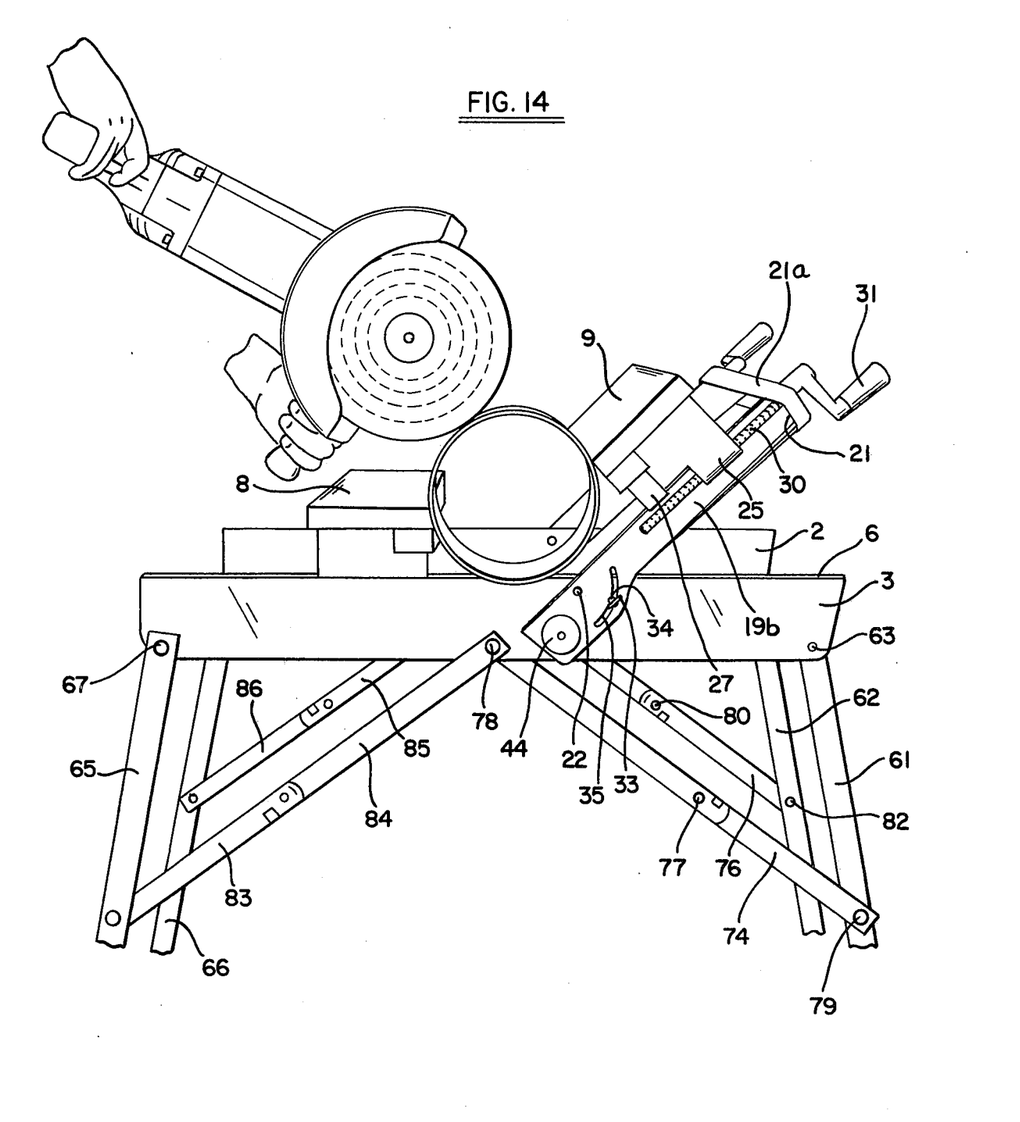
FIG. 14 is a perspective view showing how the portable workbench can be utilized to assist the user when cutting conduit.
Figure 15:
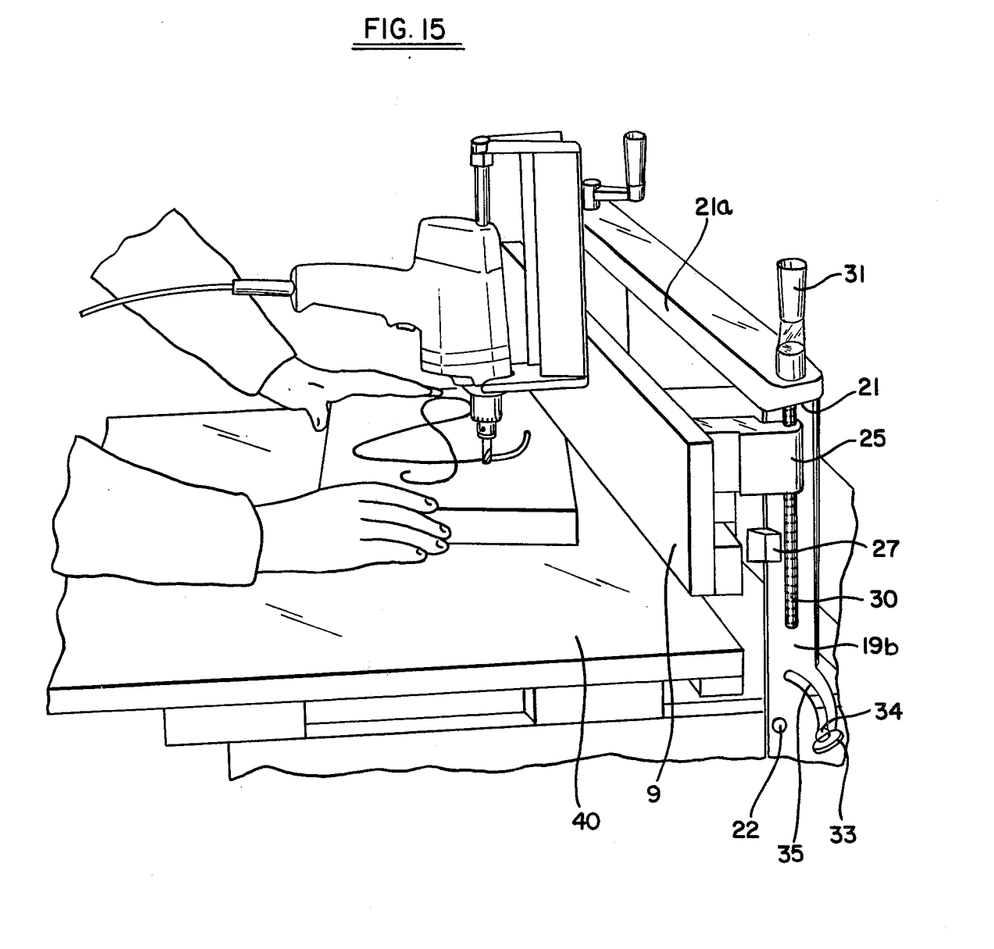
FIG. 15 shows how the workbench can be utilized for routing a groove in a workpiece; and, FIG. 16 shows how the workbench can be adapted for use as a drawing board.
Figure 16:
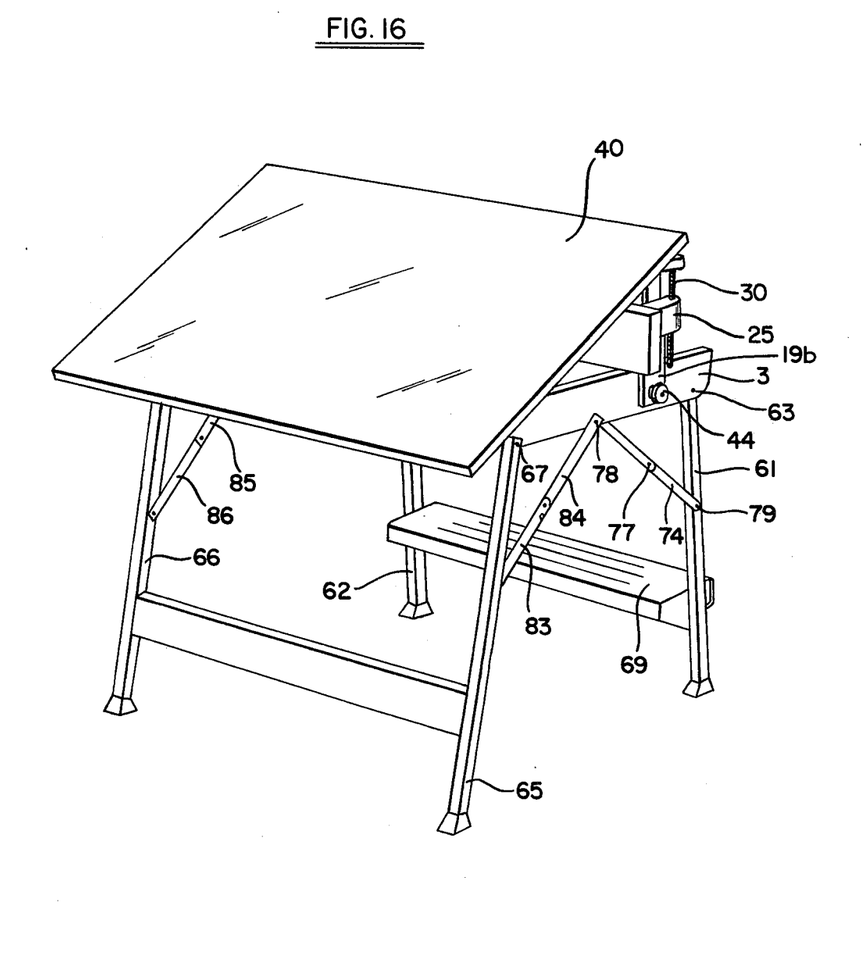

From the foregoing, it becomes manifest that the portable workbench according to my invention affords great flexiblity and affords the operator the advantage of being able to perform clamping operations which heretofore required at least two different clamping devices. For example, as shown in FIG. 14, the portable workbench can be utilized to securely hold a section of conduit during a cutting operation. FIG. 15 shows how the portable workbench is readily adaptable for performing a routing operation. The second top member 9 is positioned as shown in FIG. 4 and drill is mounted thereto and fitted with a router bit. FIG. 16 shows how the third top member 40 can be arranged as a drawing board by mounted the member 40 between the surface support means defined by flanges 6 and 7 and the second top member 9.

What I claim is:

1. A portable workbench comprising:
   a supporting structure defining surface support means and including a collapsible leg assembly for supporting said surface support means above a floor surface;
   a first top member having an upper surface and being supported by said supporting structure on said surface support means;
   a second top member having an upper surface, said upper surfaces lying in a common substantially horizontal plane;
   said top members having respective mutually adjacent side walls defining clamping surfaces;
   means for guiding said second top member relative to said supporting structure;
   means for moving said second top member along said guiding means so as to adjust the position of said second top member with respect to said first top member; and,
   means for conjointly rotating said guiding means and said second top member from a first position on said surface support means whereat said upper surfaces are in said horizontal plane to a second position whereat said second top member is in a plane transverse to said horizontal plane so as to cause said clamping surfaces and said surface support means to conjointly define a three point clamping system.

2. The portable workbench of claim 1, said guiding means being rotatable to a third position whereat said clamping surface of said second member is substantially parallel to said horizontal plane.

3. The portable workbench of claim 2 comprising: locking assembly means for fixing the angular position of said guiding means at predetermined angular positions with respect to said supporting structure.

4. The portable workbench of claim 1, said rotating means comprising:
   pivot means pivotally connecting said guiding means to said supporting structure; and,
   locking means for locking said guiding means with respect to said support structure at said second position.

5. The portable workbench of claim 4 comprising: locking assembly means for fixing the angular position of said guiding means at predetermined angular positions with respect to said supporting structure.

6. The portable workbench of claim 4 comprising:
   means for positioning said first top member along said supporting structure to a selected position on said surface support means whereby said first top member can be manually shifted and located laterally with respect to said second top member to rapidly adjust the coarse width of the clamping gap between said top members to accommodate varying sizes of workpieces whereby said moving means can be manually adjusted to fine adjust said width of said gap to tightly hold the workpiece between said top members when said second top member is in said first position and between said top members and said surface support means when said second top member is in said second position.

7. The portable workbench of claim 6, said positioning means comprising:
   indexing means formed in said supporting structure for indexing said first top member along said supporting structure to any one of a plurality of selected index positions relative to said second top member, and,
   disengageable positive securing means for coacting with said index means to positively secure said first top member to said supporting structure at any one of said index positions.

8. The portable workbench of claim 6, said first and second top members each being elongated members.

9. The portable workbench of claim 6, said second top member being an elongated member, and said first top member having a longitudinal dimension corresponding to the longitudinal dimension of said second top member and a lateral dimension substantially greater than the lateral dimension of said second top member.

10. The portable workbench of claim 4, said guide means being a bracket pivotally connected to said supporting structure by said pivot means whereby said bracket and said second top member can be rotated between said two positions.

11. The portable workbench of claim 10, said bracket being a U-shaped bracket having a base and respective legs connected to said base, said legs being pivotally connected to said supporting structure.

12. The portable workbench of claim 11, said support structure comprising a generally rigid base frame including a spaced apart pair of elongated frame members conjointly defining said surface support means, said legs being pivotally connected to respective ones of said frame members.

13. The portable workbench of claim 12, said legs being pivotally connected to said frame members at the mid portions thereof.

14. The portable workbench of claim 1, said base of said U-shaped bracket having a flange, said flange of said base being mounted on said legs so as to engage said frame members when said second top member is in said first position.

15. The portable workbench of claim 10, said moving means comprising: first and second clamping means interconnected between said guiding means and said second top member for moving said second top member over said guide means in a direction toward or away from said first top member for tightly holding a workpiece between said top members when said second top member is in said first position and between said top members and said surface support means when said second top member is at said second position, said first clamping means and said second clamping means being connected to said guide means and said second top member so as to be capable of being operated independently of each other whereby the width of the clamping gap between said top members can be adjusted to be greater at one longitudinal end of the gap than at the other longitudinal end of the gap.

16. The portable workbench of claim 15 comprising: means for angularly adjusting the first top member with respect to the second top member.

17. The portable workbench of claim 4 comprising: a third top member supported on said surface support means and having an upper surface in said common horizontal plane; and, means for positioning said third top member along said surface support means to a selected position thereon spaced from said first top member, said first and third top members being spaced away from the plane defined by said upper surface of said second top member when said second top member is in said second position whereby a workpiece placed across said first and third top members is shaped when said moving means are actuated to move said second top member along said guide means toward said common horizontal plane to engage the workpiece.

18. The portable workbench of claim 1 comprising:
a third top member having an upper surface area greater than said upper surface of said first top member;
said collapsible leg assembly including carrying means for removably carrying said third top member on said leg assembly beneath said first top member and said second top member when said collapsible leg assembly is in the open position;
said third top member being configured for removably positioning the same on said surface support means; and,
means for removably positioning said first top member on said surface support means and means for removably positioning said third top member on said surface support means whereby said first top member can be removed from said surface support means and said third top member placed thereon thereby increasing the upper work surface provided by the workbench.

19. The portable workbench of claim 18, said third top member including spacer support means for mounting said third top member on said surface support means, said spacer support means being configured so as to be insertable between said clamping surfaces whereby said third top member can be securely held between said clamping surfaces when said leg assembly is in the collapsed position thereby facilitating the portability of the workbench as a compact unit.

* * * * *